(12) United States Patent
Meyn

(10) Patent No.: US 6,277,021 B1
(45) Date of Patent: Aug. 21, 2001

(54) CARRYING HOOK FOR POULTRY

(75) Inventor: Pieter Meyn, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 09/534,759

(22) Filed: Mar. 24, 2000

(30) Foreign Application Priority Data

Mar. 26, 1999 (NL) .................................................. 1011677

(51) Int. Cl.$^7$ .................................................. A22C 21/00
(52) U.S. Cl. .................................................. 452/188; 452/182
(58) Field of Search .................................. 452/188, 187, 452/182

(56) References Cited

U.S. PATENT DOCUMENTS

| | | | |
|---|---|---|---|
| 671,900 | * | 4/1901 | Stanert .................................. 452/188 |
| 2,438,608 | | 3/1948 | Johnson . |
| 2,533,941 | * | 12/1950 | Johnson .................................. 452/188 |
| 2,685,706 | | 8/1954 | Zebarth . |
| 2,731,665 | | 1/1956 | Zebarth . |
| 3,103,696 | | 9/1963 | De Long . |
| 3,680,173 | * | 8/1972 | Martin .................................. 452/188 |
| 4,272,863 | * | 6/1981 | Parker, Jr. .................................. 452/188 |
| 5,505,657 | * | 4/1996 | Janssen et al. .................................. 452/188 |
| 5,514,033 | * | 5/1996 | Berry .................................. 452/182 |
| 5,672,100 | * | 9/1997 | Nielsen .................................. 452/188 |

FOREIGN PATENT DOCUMENTS 7406087   11/1975   (NL) .

* cited by examiner

*Primary Examiner*—Willis Little
(74) *Attorney, Agent, or Firm*—Dority & Manning

(57) ABSTRACT

A carrying hook for suspending poultry by the legs and conveying it, having two channels, each capable of receiving one leg. The channels are open at both ends. Optionally the channels are widened in the middle, and are provided with channel walls that can be separated by moving them against a spring force. In addition, the channels may mutually diverge toward their ends.

23 Claims, 2 Drawing Sheets

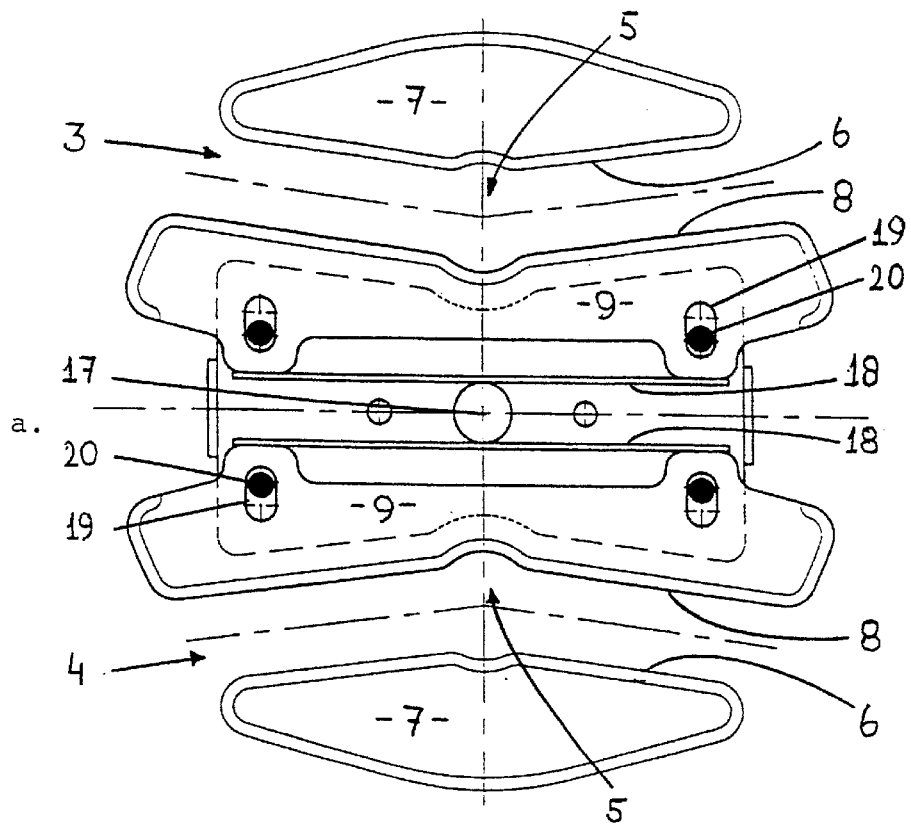
a.
FIG. 2
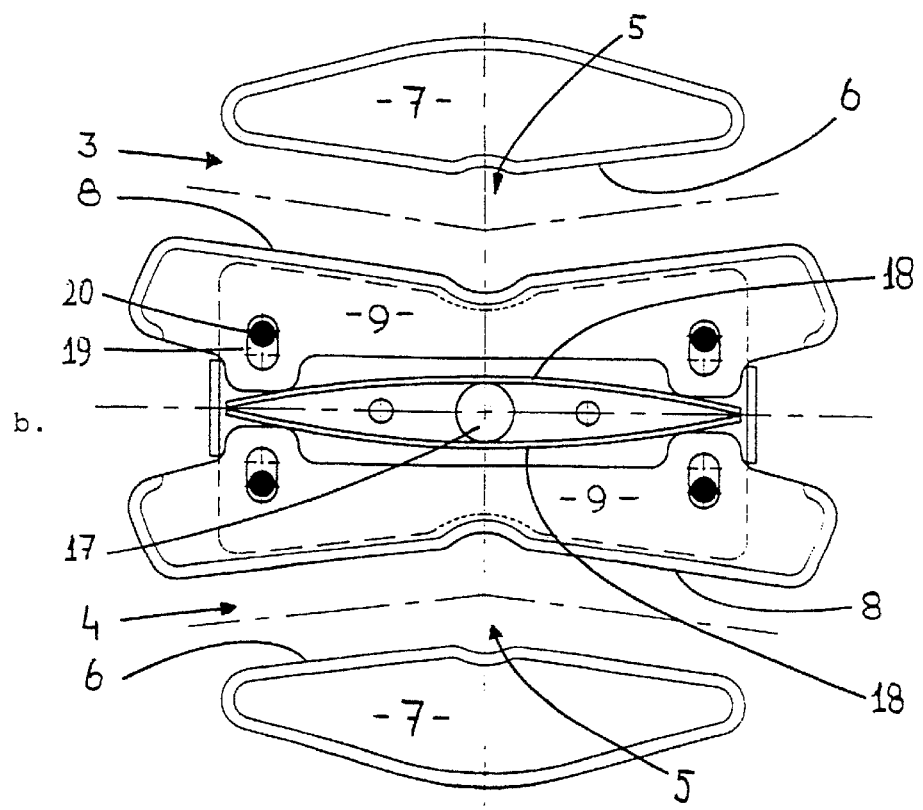
b.

CARRYING HOOK FOR POULTRY

BACKGROUND

The invention relates to a carrying hook for suspending poultry by the legs and conveying it, having two channels, each capable of receiving one leg.

Carrying hooks of the above-mentioned kind are used on a large scale in plants for the automated slaughter and further processing of poultry. In such plants the carrying hooks are part of the so-called overhead conveyors that convey the poultry suspended upside down.

A known carrying hook is provided with two U-shaped bar portions extending substantially in a horizontal plane and forming the said channels between the legs of the U-shape. The legs of the poultry are pushed into the channels, with the waling toes projecting above the U-shaped bar portions. Usually, the legs are pushed into the channel far enough to abut against the bottom of the channel joining the two legs of the U. To remove the legs from such a carrying hook, the legs are moved in the opposite direction.

SUMMARY OF THE INVENTION

It is the object of the invention, to provide a carrying hook of the above-mentioned kind that, in comparison with the conventional carrying hook, has a much wider range of application. Additional objects and advantages of the invention will be set forth in part in the following description, or may be obvious from the description, or may be learned through practice of the invention.

To this end the carrying hook according to the invention is characterized by having channels that are open at both ends.

The fact that the channels are open at both ends has an important effect in that the insertion of the legs into the channels and removal therefrom can take place at different ends of the carrying hook. The importance of this effect can be seen, among other things, from the example below:

When live poultry is manually suspended in carrying hooks in the manner applied at present on a large-scale, each fowl has the same orientation in relation to the respective carrying hook. This automatically means that the subsequent removal of the legs of the respective fowl from the carrying hook always has to occur in a uniform manner, thus also in the same direction. However, there are developments under way at present for automating the suspension of live poultry on carrying hooks. One of the problems arising with this is that once suspended in the carrying hook, different fowl may have different orientations. Basically, two orientations are possible in which the fowl in relation to each other are rotated 180° about a vertical axis. In order to be able to supply the fowl in a uniform manner to subsequent processing appliances, measures will have to be taken order to rotate the fowl 180° if they are not in the desired position. Such a rotation may take place, for example, by rotating the carrying hook or a portion thereof. However, since the removal of the fowl from the carrying hooks always takes place in an established direction, the movement in respect of the carrying hook will depend on whether they are rotated or non-rotated carrying hooks. This is, however, only possible if the channels, as proposed in the present invention, are opened at both ends.

The importance of the carrying hooks according to the invention with the channels open at both ends is also evident when using so-called rehangers. With such rehangers, the fowl are transferred from one processing line to another processing line. The processing lines cooperate with various appliances which, depending on the manufacturer, may depart from different positions of the fowl in the carrying hooks. In order to accommodate this variation, a number of maneuvers take place in the rehanger. This is especially the case with the conventional carrying hooks. However when carrying hooks according to the invention are used having channels that are open at both ends, the number of rehanging steps may be reduced since, as already mentioned above, the possibility exists of rotating the carrying hooks while it is still possible to remove the fowl from the carrying hooks in the desired direction.

The carrying hooks according to the invention also provide considerable advantages in portioning lines. The various portioning machines in a portioning line each require the fowl to be in a different optimal position in relation to the machine. For this purpose, rotatable carrying hooks are used. With the conventional carrying hooks having channels with only one open end, the carrying hooks always have to be rotated back to their original position, which involves an extra operation. If, however, carrying hooks are used having channels that are open at both ends, this extra operation may (in many cases) be omitted.

In a preferred embodiment of the carrying hook according to the invention, the channels are widened in the middle.

With the conventional carrying hook, whose channels are formed by U-shaped bars, positioning of the legs occurs by their engaging the bottom of the U-shaped bar portion. However, the carrying hook according to the invention does not have such a bottom, and widenings are provided in the middle, to allow centering of the legs. This prevents the legs from unintentionally sliding out of the channels.

It is further preferred, that the channels be provided with channel walls that can be separated by moving them against a spring force, generated by a spring member. The spring force tries to move the channel walls toward each other such that a clamping force is exerted on the legs in the channel. The strength of the clamping force depends on the force of the spring. This clamping force, optionally in combination with the central widening mentioned earlier, provides in all circumstances good positioning and engagement of the legs in the channels.

In this framework, it is constructively feasible that of each channel, one channel wall is stationary and the other channel wall is movable against the spring force, away from the one channel wall.

It suffices therefore, that only one channel will always be movable, while the opposite channel wall is stationary. In this way the construction of the carrying hook is rather uncomplicated, the manufacturing costs are kept within a limit, and the carrying hook requires little maintenance.

In this framework a simply realizable embodiment of the carrying hook according to the invention is proposed. In it the movable channel wall is formed by an edge of a flat plate that is slidable in the plane of the plate, whose side opposing the edge rests against a spring member and cooperates with guide means. By means of the spring member, the edge of the flat plate is pushed toward the stationary channel wall. The presence in the channel of a leg causes the flat plate, in cooperation with the guide means, to slide into a position in which the spring member comes under greater tension. The spring member may, for example, be a leaf spring.

The movement and extreme positions of the flat plate can be fixed in a simple manner, by providing the plate with guide notches for engaging guide pins.

It is further preferred, that the channels mutually diverge toward their ends.

This special embodiment variant of the carrying hook is particularly advantageous when insertion and removal of the legs in and out of the carrying hooks takes place at so-called return wheels, which at their circumference cooperate with the carrying hooks. The mutually divergent shape of the channels is then chosen such that the respective divergent ends extend radially in relation to the return wheels. This allows the legs to be conveniently inserted into and removed from the channels. The measure in which the channels diverge depends in such a case, among other things, on the diameter of the return wheels.

As already briefly explained above, it may be necessary when automatically suspending poultry from carrying hooks, to rotate some of the poultry about a vertical axis. For such a case a special variant of the carrying hook according to the invention is mentioned, having an upper part and a lower part wherein the lower part is provided with the channels and, in relation to the upper part, is rotatable about a vertical axis. The upper part has a permanent orientation that may be determined by a rail along which the upper part, which is then provided with runners, moves. The rotational position of the lower part can be altered depending on the orientation of the fowl in the carrying hook.

The efficiency of a carrying hook embodied this way may be further improved if the upper part and lower part possess cooperating centering members for determining mutual rotational positions.

The centering members ensure that particular required rotational positions are easily reached and maintained. It is, for example, possible that the centering members allow two rotational positions that differ from one another by 180°. However, it is also possible to provide a number of different rotational positions, for example, four 90° rotational positions.

For the constructive embodiment of such centering members an embodiment of a carrying hook may be considered, in which the upper part and lower part are provided with a cooperating curved track and tracking runners, whereby the upper part and the lower part can be vertically displaced in relation to one another. Force of gravity causes the lower part to take a position in relation to the upper part such that the tracking runners' position in relation to the curved track is as low as possible. In this way, a suitable design of the curved track allows the rotational position to be established as desired. During the lower part's rotation in relation to the upper part, the lower part has to move vertically upward against gravity until it has passed a highest position. Whereafter, an automatic movement to a subsequent desired rotational position takes place under the influence of the force of gravity.

The invention will now be explained with reference to the drawings in which an embodiment of the carrying hook according to the invention is shown.

BRIEF DESCRIPTION OF THE DRAWINGS

FIG. 2 shows a cross section of the lower part of the carrying hook of FIG. 1 in two positions.

DETAILED DESCRIPTION

Figure 1:
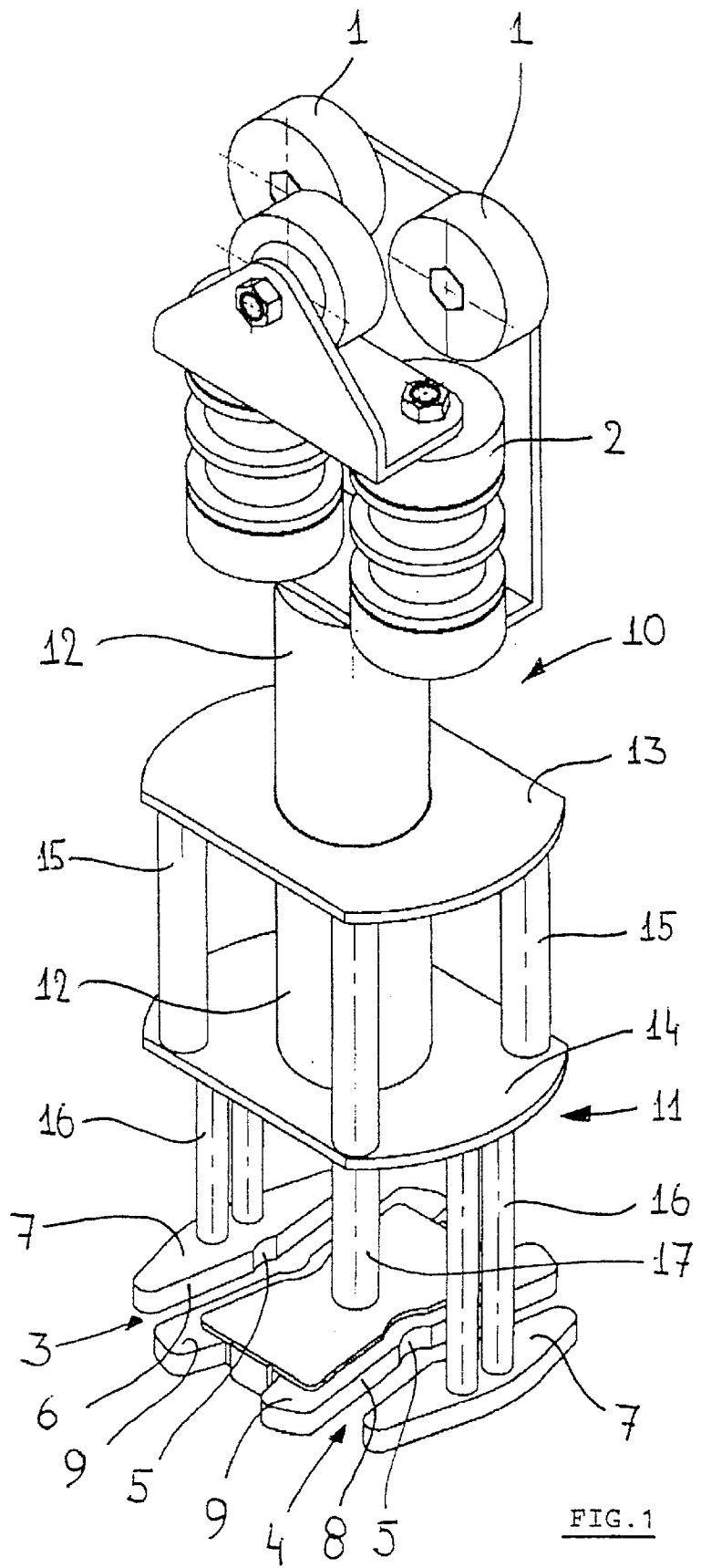
FIG. 1 shows a perspective view of an embodiment of the carrying hook according to the invention.

At is top, the carrying hook illustrated is provided with idlers 1 and guide rollers 2. With the aid of said idlers 1 and guide rollers 2 the carrying hook is movable in a manner known in the art along a stationary conveyor track (not shown).

At its lower end, opposite the idlers 1 and the guide rollers 2, the carrying hook is provided with two channels 3 and 4. These channels are intended for receiving the legs of the poultry to be conveyed by a carrying hook.

As can be seen clearly from the Figures, the channels 3 and 4 are open at both ends. These channels 3 and 4 are further provided with a central widening 5.

In the embodiment shown, each channel 3 and 4 possesses a stationary channel wall 6, formed by a stationary plate portion 7. The channel wall 8 of each channel 3 and 4, opposite the stationary channel wall 6, is formed by an edge of a flat plate 9, slidable in the plane of the said plate, whose side that is positioned opposite the edge forming the channel wall 8, rests against a spring member, such as a leaf spring 18. This spring member 18 loads the flat plate 9 in the direction of the stationary plate part portion 7 into the position shown in FIG. 2a.

As described, each channel 3 and 4 therefore possesses a stationary channel wall 6 and a movable channel wall 8, so that the shape and dimensions of the channels 3 and 4 can to some extent be altered in opposition to the force of the springs 18 acting on the flat plates 9. Thus, while the leg of a fowl is being inserted into the channels 3 and 4, the channel walls 6 and 8 can thus be moved apart into the position shown in FIG. 2b and when the leg has reached the central widening 5, back toward each other into the position shown in FIG. 2a. In this manner it is possible to properly position the leg in the respective channel 3 or 4.

For a controlled movement of the movable flat plates 9, the same may be provided with guide notches 19 engaging the guide pins 20 that are part of the carrying hook. Alternatively, a stop block (not shown) may be provided to arrest the plates 9 or its springs 18, respectively.

The drawing further clearly shows that toward their ends, the channels in the illustrated embodiment are mutually divergent. Such a divergent channel shape is especially advantageous when the carrying hook cooperates with return wheels such as is generally the case in poultry slaughtering plants. With such return wheels, the carrying hooks follows a track as defined by the circumference of the return wheels, and the diverging shape of the channels is then selected such that the ends of the channels 3 and 4 facing away from the return wheels extend exactly radially in relation to the respective return wheels.

In the embodiment of the carrying hooks shown, the same consists of an upper part 10 and a lower part 11, which in relation thereto is rotatable about a vertical axis. At its bottom side, the upper part 10 ends in a cylindrical projection 12, while the upper side of the lower part 11 is formed by two plates 13 and 14, interconnected by pins 15. The lower plate 14 and the stationary plate portions 7 are connected by bars 16, while a central bar 17 connects the lower plate 14 with a construction wherein the movable flat plates 9 are received.

As mentioned, the upper part 10 and lower part 11 are in relation to one another rotatable about a vertical axis. Such rotation can, for example, be realized by external elements engaging the pins 15. The mutual rotational positions between the upper part and lower part can optionally be determined by cooperating centering members provided on both parts. A construction is conceivable, for example, wherein the upper part and lower part are provided with a cooperating curved track and guide rollers, wherein the upper part and lower part are also vertically displaceable in relation to each other. The construction of curved track and guide rollers may, for example, be located in the interior of the cylindrical projection 12. Under the influence of gravity, the lower part 11 will move downward in relation to the upper part 10 to a position determined by the curved track and the guide rollers. When the lower part 11 is rotated in relation to the upper part 10, it will simultaneously move upward in opposition to the gravitational force. This occurs until a highest position, again determined by the interaction between the curved track and the guide rollers, has been passed and the lower part 11, under the influence of the gravitational force, moves to a new stable rotational position.

Other mechanisms are, of course, also possible to determine the mutual rotational positions between the upper part 10 and the lower part 11.

The invention is not limited to the above-described embodiments, which in the framework of the invention may be varied in numerous ways, all within the scope of the appended claims. It should be appreciated by those skilled in the art that various modifications and variations can be made in the present invention without departing from the spirit and scope of the invention.

What is claimed is:

1. A carrying hook for suspending poultry by the legs and conveying it, having two channels, each capable of receiving one leg, characterized in that the channels are open at both ends.

2. A carrying hook according to claim 1 characterized in that the channels are widened in the middle.

3. A carrying hook according to claim 1 characterized in that the channels are provided with channel walls that can be separated by moving them against a spring force.

4. A carrying hook according to claim 3, characterized in that of each channel one channel wall is stationary and the other channel wall is movable against the spring force, away from the one channel wall.

5. A carrying hook according to claim 3, characterized in that the movable channel wall is formed by an edge of a flat plate that is slidable in the plane of the said plate, whose side opposing said edge rests against a spring member and cooperates with guide means.

6. A carrying hook according to claim 3, characterized in that the plate is provided with guide notches for engaging guide pins.

7. A carrying hook according to claim 2 characterized in that the channels are provided with channel walls that can be separated by moving them against a spring force.

8. A carrying hook according to claim 7, characterized in that of each channel one channel wall is stationary and the other channel wall is movable against the spring force, away from the one channel wall.

9. A carrying hook according to claim 7, characterized in that the movable channel wall is formed by an edge of a flat plate that is slidable in the plane of the said plate, whose side opposing said edge rests against a spring member and cooperates with guide means.

10. A carrying hook according to claim 7, characterized in that the plate is provided with guide notches for engaging guide pins.

11. A carrying hook according to claim 1, characterized in that the channels mutually diverge toward their ends.

12. A carrying hook according to claim 1, characterized by an upper part and a lower part, the lower part being provided with the channels and in relation to the upper part being rotatable about a vertical axis.

13. A carrying hook according to claim 12, characterized in that the upper part and the lower part possess cooperating centering members for determining mutual rotational positions.

14. A carrying hook according to claim 13, characterized in that the upper part and the lower part are provided with a cooperating curved track and tracking runners, whereby the upper part and the lower part can be vertically displaced in relation to one another.

15. A carrying hook for conveying poultry and for suspending it by the legs, comprising:

four channel walls defining two channels, each of the channels capable of receiving one leg of the poultry to suspend and convey the poultry, and wherein each of the two channels have opposite ends that are open.

16. The carrying hook for conveying poultry and for suspending it by the legs as set forth in claim 15, wherein each of the two channels are widened at a point between the ends of each of the two channels.

17. The carrying hook for conveying poultry and for suspending it by the legs as set forth in claim 15, further comprising a spring member located proximate to the channel walls, wherein the two channels can be widened by application of the spring member to at least one movable wall of each channel.

18. The carrying hook for conveying poultry and for suspending it by the legs as set forth in claim 17, wherein one channel wall of each channel is stationary and the other respective channel wall is movable against the spring member away from the stationary wall of each corresponding channel.

19. The carrying hook for conveying poultry and for suspending it by the legs as set forth in claim 17, wherein the movable wall of each channel is formed by an edge of a plate that is slidable in a plane of the plate, each plate having a side opposite from the edge of the plate that engages the spring member, and further comprising guide means that cooperate with each of the plates.

20. The carrying hook for conveying poultry and for suspending it by the legs as set forth in claim 19, wherein the plate has a plurality of guide notches for engaging guide pins.

21. The carrying hook for conveying poultry and for suspending it by the legs as set forth in claim 15, wherein each of the two channels mutually diverge towards the ends of the two channels.

22. The carrying hook for conveying poultry and for suspending it by the legs as set forth in claim 15, wherein the carrying hook has an upper part and a lower part, the lower part has the two channels and is rotatable in relation to the upper part about a vertical axis.

23. The carrying hook for conveying poultry and for suspending it by the legs as set forth in claim 22, wherein the upper and lower parts have cooperating centering members for establishing mutual rotational position of the upper and lower parts.

* * * * *